United States Patent
Kodama et al.

(10) Patent No.: US 6,818,734 B1
(45) Date of Patent: Nov. 16, 2004

(54) POLYBENZAZOLE ARTICLE AND PRODUCTION METHOD THEREOF

(75) Inventors: Tetsuo Kodama, Ohtsu (JP); Yusuke Shimizu, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/502,834

(22) Filed: Feb. 11, 2000

(30) Foreign Application Priority Data

Feb. 15, 1999 (JP) ............................................. 11/036314

(51) Int. Cl.[7] .......................... C08G 73/56; C08G 73/00
(52) U.S. Cl. ....................... 528/423; 528/422; 528/425; 528/86; 528/211
(58) Field of Search ................................ 528/423, 422, 528/425, 86, 211

(56) References Cited

U.S. PATENT DOCUMENTS 5,552,221 A  9/1996  So et al.

FOREIGN PATENT DOCUMENTS

GB          609 945         10/1948

OTHER PUBLICATIONS

Patent Abstracts of Japan, JP 09 316326 (Dec. 9, 1997).

Patent Abstracts of Japan, JP 10 226922 (Aug. 25, 1998).

*Primary Examiner*—Duc Truong
(74) *Attorney, Agent, or Firm*—Leydig, Voit & Mayer, Ltd.

(57) ABSTRACT

The present invention provides a polybenzazole article superior in light resistance, which contains a light-resisting agent that allows for a regular reflectance of the article of not more than 30% in not less than 30% of the wavelength region of from 450 nm to 700 nm and a production method thereof. The present invention provides a polybenzazole article having noticeably superior light resistance, which is preferable as industrial materials and fireman's garments, and a production method thereof.

4 Claims, 2 Drawing Sheets regular reflectance spectrum of PBO fiber regular reflectance spectrum of PBO fiber
treated with p-phenylenediamine solution

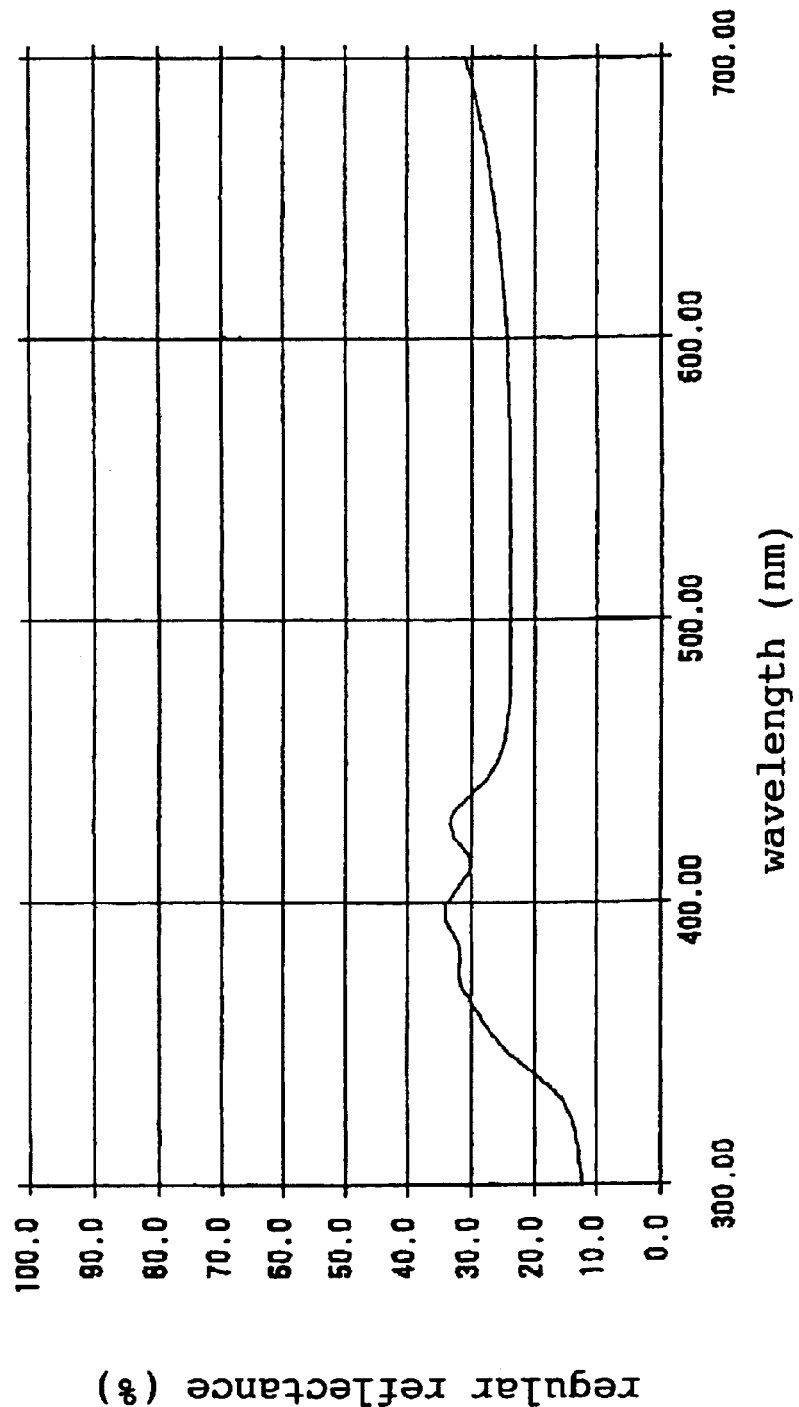

POLYBENZAZOLE ARTICLE AND PRODUCTION METHOD THEREOF

TECHNICAL FIELD OF THE INVENTION

The present invention relates to a polybenzazole article having markedly superior light resistance, which is preferable as industrial materials, and to a production method thereof.

BACKGROUND OF THE INVENTION

Polybenzazole fiber has at least twice the strength and elastic modulus of p-aramide fiber and is a typical commercially available super fiber at the moment. In addition, it has a limiting oxygen index of 68 and high heat resistance to stand decomposition temperatures of up to 650° C. Thus, the fiber is expected to be a next generation super fiber.

Production of articles from a polyphosphoric acid solution of polybenzazole polymer has been known. For example, production conditions are disclosed in U.S. Pat. No. 5,296,185 and U.S. Pat. No. 5,385,702, water washing and drying method is disclosed in WO 94/04726, and heat treatment is disclosed in U.S. Pat. No. 5,296,185.

While polybenzazole articles have extremely advantageous properties as industrial materials, as mentioned earlier, once physically damaged, their light resistance becomes lower. In particular, when they are exposed to a light in the visible region, they show lower strength. As used herein, the physical damage includes bending and kink band caused by shear force. The kink band is observed as a black band under a microscope of 200 magnification. An article free of physical damage does not show any significant decrease in strength upon exposure to sunlight, but is susceptible to damage during, for example, weaving a fiber, knitting a fiber or processing a fiber to give various products. Therefore, the present inventors have intensively studied to give a polybenzazole article, which is light, highly strong, and which has high elastic modulus, high heat resistance, and high light resistance.

SUMMARY OF THE INVENTION

Accordingly, the present invention provides a polybenzazole article superior in light resistance, which comprises a polybenzazole and a light-resisting agent that allows for a regular reflectance of the article of not more than 30% in not less than 30% of the wavelength region of from 450 nm to 700 nm. Preferably, the present invention provides the above-mentioned polybenzazole article, wherein the light-resisting agent allows for a regular reflectance of the article of not more than 20% in not less than 10% of the wavelength region of from 450 nm to 700 nm, the above-mentioned polybenzazole article having a strength of not less than 35 g/d, the above-mentioned polybenzazole article wherein the light-resisting agent is an oxidation dyestuff, the above-mentioned polybenzazole article wherein the light-resisting agent is an aromatic amine compound or phenol, and the above-mentioned polybenzazole article wherein the light-resisting agent is added in a proportion of 0.01% to 20.0% by weight of the article.

The production method of the present invention comprises extruding a polybenzazole solution, extracting a solvent, and adding a light-resisting agent to an article before drying, whereby to give a polybenzazole article superior in light resistance. Further, it is the above-mentioned production method of a polybenzazole article having superior light resistance, wherein the light-resisting agent is added to the article in not longer than 10 minutes.

DETAILED DESCRIPTION OF THE INVENTION

Figure 1:
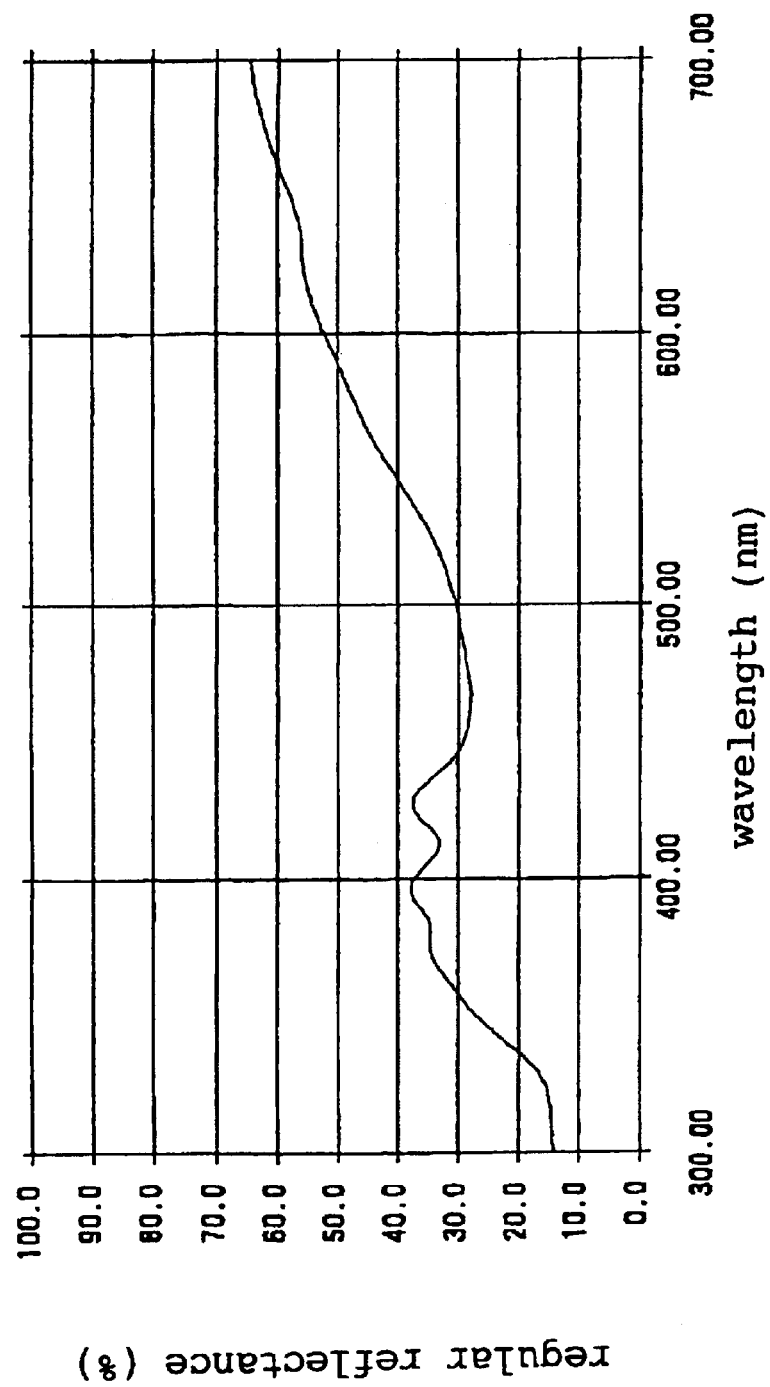
FIGS. 1-(1) and 1-(2) show regular reflectance spectra of a PBO fiber at 300 nm–700 nm, wherein FIG. 1-(1) shows the results of a PBO fiber free of light-resisting agent and FIG. 1-(2) shows the results after treatment with a light-resisting agent.

The present invention is described in detail in the following. Polybenzazole fiber of the present invention refers to fibers made from a polybenzazole (PBZ) polymer. The PBZ polymer to be used to give the polybenzazole article of the present invention includes polyparaphenylene benzobisoxazole (PBO) homopolymer, polybenzothiazole (PBT) homopolymer, and random, sequential or block copolymer of PBO or PBT, which preferably contains PBO component in substantially not less than 85% by mole. The polybenzazole (PBZ) polymers are disclosed in, for example, Wolf et al., "Liquid Crystalline Polymer Compositions, Process and Products" (U.S. Pat. No. 4,703,103, Oct. 27, 1987), "Liquid Crystalline Polymer Compositions, Process and Products" (U.S. Pat. No. 4,533,692, Aug. 6, 1985), "Liquid Crystalline Poly(2,6-Benzothiazole) Compositions, Process and Products" (U.S. Pat. No. 4,533,724, Aug. 6, 1985), "Liquid crystalline Polymer Compositions, Process and Products" (U.S. Pat. No. 4,533,693, Aug. 6, 1985), Evers et al, "Thermooxidatively Stable Articulated p-Benzobisoxazole and p-Benzobisoxazole Polymers" (U.S. Pat. No. 4,539,567 Nov. 16, 1982), Tsai et al, "Method for Making Heterocyclic Block Copolymer" (U.S. Pat. No. 4,578,432, Mar. 25, 1986), and the like.

The structural unit contained in the PBZ polymer is preferably selected from rheotropic liquid crystalline polymers. This monomer unit is shown in the following structural formulas (a)–(h), more preferably monomer units selected from the structural formulas (a)–(c).

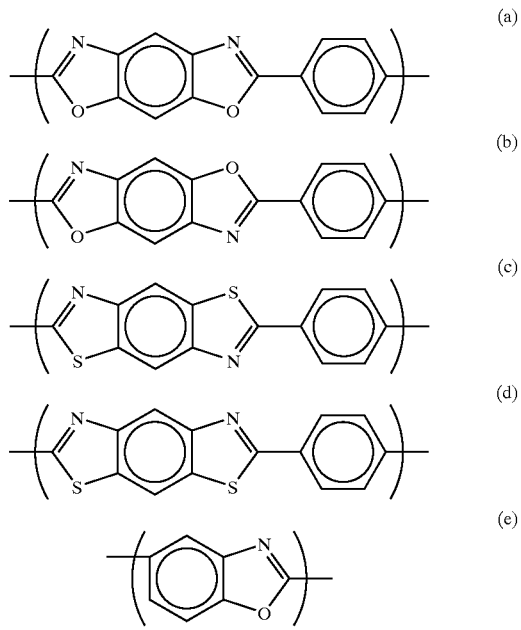

-continued

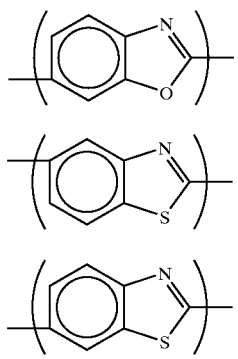

(f)

(g)

(h)

A suitable solvent for preparing a dope of a polymer substantially made from PBO is exemplified by cresol and non-oxidative acid capable of dissolving the polymer. Examples of suitable acid solvent include polyphosphoric acid, methanesulfonic acid, high conc. sulfuric acid and mixtures thereof. More preferred is polyphosphoric acid.

The polymer concentration in the solvent is preferably at least 7% by weight, more preferably at least 10% by weight, most preferably at least 14% by weight. The maximum concentration thereof is limited by actual handling property, such as solubility of polymer and viscosity of dope. Due to such limiting factors, the polymer concentration of the dope does not exceed 20% by weight.

The preferable homopolymer, copolymer and the dope are synthesized by known methods. For example, the methods are disclosed in U.S. Pat. No. 4,533,693 (Aug. 6, 1985) to Wolfe et al, U.S. Pat. No. 4,772,678 (Sep. 20, 1988) to Sybert et al, and U.S. Pat. No. 4,847,350 (Jul. 11, 1989) to Harris. According to U.S. Pat. No. 5,089,591 (Feb. 18, 1992) to Gregory et al, the polymer substantially consisting of PBO can be made to have a high molecular weight by high-speed reaction in a dehydrating acid solvent at a relatively high temperature under high shear conditions.

A dope containing a polymer polymerized in this way is fed to the extruder and discharged from the spinneret generally at a temperature not less than 100° C. A polymer yarn requires a long draw zone to achieve a sufficient draw ratio (SDR), as disclosed in U.S. Pat. No. 5,296,185. It is preferably cooled uniformly with a rectified cooling air having a relatively high temperature (not less than solidification temperature of dope and not more than spinning temperature). The length (L) of the draw zone is such that the solidification completes in a non-coagulating air, which is roughly determined by a single hole discharge amount (Q). For fine fiber properties to be achieved, a stress of not less than 2 g/d should be applied to the dope when extruded into the draw zone, upon polymer conversion (supposing the stress applies solely on polymer).

The polymer stretched in the draw zone is then led to an extraction (coagulation) bath. Due to high tension, turbulence in the liquid in the extraction bath need not be considered and any type of extraction bath can be used. For example, a funnel type, water tank type, aspirator type or waterfall type bath can be used. The extracting solution is suitably an aqueous phosphoric acid solution or water. When phosphoric acid is used, plural extraction baths are used and not less than 99%, preferably not less than 99.5%, of phosphoric acid is extracted from the polymer in the final extraction bath. The liquid to be used as an extracting medium in the present invention is subject to no particular limitation. Preferred are water, methanol, ethanol, acetone and the like, which substantially do not have compatibility with polybenzazole. It is also possible to perform the extraction (coagulation) in multi-stages to make the concentration of the aqueous phosphoric acid solution become stepwisely thinner, followed by ultimate washing with water. It is further preferable to neutralize the fiber bundle with an aqueous sodium hydroxide solution and the like before washing with water.

The present invention is characterized in that a step for adding a light-resisting agent is included in an article production line to give an article containing the light-resisting agent. A light-resisting agent is added to a dope after completion of polymerization id and immediately before extrusion, or is contained by immersion of or coating on an article after entry thereof into a coagulation bath after extrusion of the dope from spinneret, and before a drying step. The agent is contained in an article by a conventional method, which is exemplified by, but not limited to, the following methods. For example, a light-resisting agent is added to a dope and the mixture is kneaded in a twin screw kneader to give a homogeneous mixture of polybenzazole and the light-resisting agent, followed by extrusion spinning, or a light-resisting agent is previously dissolved in a coagulation agent, into which a dope having a usual composition is led to allow coagulation, or an article is immersed in or coated with an aqueous solution containing a light-resisting agent or a solution of the agent in an organic solvent by immersion method, kiss roll, method or guide method, or is sprayed onto an article on a roller, during, before or after a water washing step or neutralization step.

There are a multitude of fine holes called capillary inside a polybenzazole article and water is contained in these capillaries before drying. The holes are interconnected and connect the outside with the inside. Using these communicating capillaries, therefore, material transfer is made possible. A light-resisting agent on the surface of the article can be led to the inside by adding the agent after solvent extraction (coagulation) and before drying. In fact, the immersion time necessary for adding a light-resisting agent after entry into coagulation bath and before drying step is not less than 0.1 second, preferably not less than 0.5 second, most preferably not less than 1 second. It is possible to add a sufficient amount of a light-resisting agent by immersion for the above-mentioned period. However, too long a time period for immersion results in a higher production cost, which is not preferable.

When the article is a fiber, moreover, the obtained fiber is woven or knitted, and a light-resisting agent may be coated during the dyeing and post-processing steps. In view of productivity, a treatment time of 10 minutes or less is preferable.

The light-resisting agent is exemplified by, but not limited to, an oxidation dyestuff compound that is oxidized by the action of an oxidizing agent inclusive of air and develops color, aromatic amines and phenols. The oxidation dyestuff compound contains not a dye synthesized by oxidation but an intermediate that produces dye upon oxidation. To be exact, it is a base that generates an oxidation dyestuff, which is also called an oxidation base. Examples of the aromatic amine and phenol include aniline, o-phenylenediamine, m-phenylenediamine, p-phenylenediamine, o-aminophenol, m-aminophenol, p-aminophenol, naphthol, derivatives thereof, acid salts thereof and the like. In general, these compounds are solid or liquid, and used upon dissolution in a solvent unless it can be directly added to a dope to give a homogeneous mixture. The solvent may be any, such as water, aqueous solution such as aqueous phosphoric acid solution, alcohols such as ethanol, methanol, ethylene glycol and the like, ketones such as acetone, and the like, as long as it is compatible with a light-resisting agent and can permeate into a fiber. The solution is treated with sodium hypochlorite, hydrogen peroxide, iron(III) chloride, sodium nitrite, air and the like to promote oxidation and condensation of the light-resisting agent. The light-resisting agent develops color, reacts with or adsorbs onto a polybenzazole article, and hardly washed off in the following washing step. When water is used as the solvent in consideration of environment, safety, and waste treatment, a phenylenediamine compound is most preferable, which has high solubility, is easily oxidized and which develops color only with air. It is possible to use concurrently two or more kinds of light-resisting agents. When different kinds of oxidation dyestuff compounds are used alongside, the oxidation and color development rate may significantly vary to produce different effects.

For diffusion permeation into a polybenzazole article, the concentration of light-resisting agent in a solution is preferably as high as possible. However, an unnecessarily high concentration lowers the strength of the article, in proportion to the weight ratio of the light-resisting agent, and increases the amount of waste from the washing step. While the time of immersion in a solution containing a light-resisting agent is desirably as long as possible, the cost of equipment poses a problem. While the concentration of a solution containing a light-resisting agent, and immersion time in this solution need to be optimized according to the shape of the polybenzazole article, the article can be immersed in a solution containing a light-resisting agent in a concentration of 0.01% by weight–20% by weight for 10 minutes or less, preferably 5 minutes or less, more preferably 1 minute or less, most preferably 30 seconds or less.

After washing with water, drying (heat treatment) at not less than 100° C., generally lower than 300° C., eliminates the connection between capillaries, and the light-resisting agent can be easily fixed in the fiber. The strength DT after heat treatment is not less than 35 g/d. It is also important to minimize an adverse effect of the heat treatment on the polymer.

For the article of the present invention to show effective light resistance, the article first needs to contain a light-resisting agent, that allows the article to have a regular reflectance of not more than 30%, in not less than 30%, preferably not less than 80%, more preferably not less than 95%, of the region of the wavelength of from 450 nm to 700 nm. Further, the article needs to contain a light-resisting agent that allows the article to have a regular reflectance of not more than 20%, in not less than 10%, preferably not less than 30%, of the region of the wavelength of from 450 nm to 700 nm. Specific examples of the light-resisting agent include those that develop the colors of black, purple and brown, which are characteristic of an oxidation dyestuff. FIG. 1 shows regular reflectance spectra of an untreated PBO fiber and regular reflectance spectrum of PBO fiber treated with an oxidation dyestuff (p-phenylenediamine, 5% by weight of fiber).

Secondly, a light-resisting agent that prevents, to the highest possible extent, a decrease in the strength due to a heat treatment should be used. After adding a light-resisting agent to a polybenzazole fiber, for example, a dry treatment at a high temperature of from about 100° C. to 350° C. is applied. When addition of a light-resisting agent causes a drastic decrease in the strength during heat treatment, the superior properties peculiar to polybenzazole article cannot be maintained. From this aspect, a light-resisting agent needs to be carefully selected and the above-mentioned light-resisting agents are recommended.

Thirdly, an article preferably contains an appropriate amount of a light-resisting agent. The content is preferably not less than 0.01% by weight and not more than 20.0% by weight, most preferably not less than 0.5% by weight and not more than 10.0% by weight. The content of light-resisting agent can be confirmed based on differences in the weights per given length, areas or volumes of untreated article and an article treated with light-resisting agent.

The chemical state and action of the light-resisting agent compound in the article are not known for sure. Shading by color development, long coupling system, electron donating property or radical trapping property of a dyestuff having a small oxidation reduction potential, or reaction with polymer, and stabilization by configuration are inferred, but the present invention is not limited by this consideration.

The measurement methods used in the present invention are described in the following.

<Measurement Method of Visible Reflection Spectrum>

As an ultraviolet visible light spectrophotometer, Hitachi U-3500 automatic recording spectrophotometer was used. An angled (10°) spacer was placed at a location for a reflection sample in a φ60 mm integrating sphere apparatus equipped with an ultrahigh sensitivity photomultiplier R928, a sample (pressworked article) having a thickness of not less than 3 mm was set in such a manner that a light was not leaked, and a regular reflection spectrum was measured. A white reflector tablet made of aluminum oxide was set at the above-mentioned location for the sample, and the regular reflectance spectrum of the sample was obtained using the obtained reflection spectrum as 100% regular reflectance. A thin fiber sample was cut at a length of not more than 5 mm, and pressed to have a uniform thickness of not less than 3 mm with the pressure of not less than 8 t/cm$^2$ for not less than 2 min and used as a sample. Measurement conditions were as follows.

Measurement wavelength: 300 nm–700 nm

Scanning speed: 600 nm/min

Slit (visible): 5.00 nm

Photomultiplier voltage: automatic control

PbS sensitivity: 2

<Evaluation Method of Light Resistance>

The light resistance was evaluated by measuring the strength of an article before and after exposure to light.

A water-cooled xenon arc weather meter (manufactured by Atlas, model Ci 35A) was used for light exposure test. An article was wound around a metal frame and set to the apparatus. Using a quartz inside filter glass and a type S porosilicate outside filter glass, continuous operation was performed for 100 hr under the conditions of irradiation illumination 0.35 W/m$^2$ (at 340 nm), black panel temperature (83±3)° C., and test tank inside humidity (50±5)%. When the article was wound around the metal frame, the article was stretched toward the reverse direction using a stainless scale having a thickness of 0.80 mm and folded three times on the light exposure plane, thereby to cause kink band (damage) on the article.

<Measurement Method of Strength>

An article, particularly a fiber, was measured for strength by a tensile tester (manufactured by A & D, model RTM 250) according to JIS-L 1013. When the sample was set, a load of 30 g/denier was applied and tensile test was performed after taking up the slack of the sample.

The present invention is explained in more detail in the following by way of Examples, to which the present invention is not limited.

EXAMPLE 1

A spinning dope containing polyparaphenylene benzobisoxazole (14.0% by weight) obtained by the method described in U.S. Pat. No. 4,533,693 and having an intrinsic viscosity as measured with a methanesulfonic acid solution at 30° C., of 24.4 dL/g, and polyphosphoric acid containing phosphorus pentaoxide in 83.17% by weight was spun. The dope was passed through a metal net filter, and kneaded and defoamed in a twin screw kneader. The pressure was elevated, the dope temperature was maintained at 170° C., and the dope was spun at 170° C. from a spinneret having 160 holes. The delivered yarns were cooled with cooling air at 60° C. and wound around a godet roller to afford a spinning speed. The yarns were led into an extraction (coagulation) bath of a 20% by weight aqueous phosphoric acid solution maintained at a temperature of 20±2° C. The yarns were successively washed with ion exchange water in a second extraction bath, immersed in a 0.1 mol/L sodium hydroxide solution for neutralization, immersed in a black aqueous solution containing p-phenylenediamine (5% by weight) at 40° C. for 60 seconds. After washing with water for 10 seconds, the yarns were dried at 120° C. for 120 seconds. The obtained fiber was folded 3 times and subjected to light resistance test. The results are shown in Table 1.

EXAMPLE 2

The fiber was prepared according to the method described in Example 1 except that the yarns were dried at 300° C. for 120 seconds after the final water washing. The obtained fiber was folded 3 times and evaluated for resistance to light. The results are shown in Table 1.

EXAMPLE 3

The fiber was prepared according to the method described in Example 1 except that the yarns were immersed in a black solution of p-phenylenediamine (10% by weight) at 50° C. for 15 seconds and the yarns were washed with water for 10 seconds and dried at 300° C. for 120 seconds after neutralization step. The obtained fiber was folded 3 times and evaluated for resistance to light. The results are shown in Table 1.

EXAMPLE 4

The fiber was prepared according to the method described in Example 1 except that the yarns were immersed in a black mixture of p-phenylenediamine (0.2% by weight) and m-phenylenediamine (0.2% by weight) at 50° C. for 1 min after neutralization step, and the yarns were washed with water for 10 seconds and dried at 300° C. for 120 seconds. The obtained fiber was folded 3 times and evaluated for resistance to light. The results are shown in Table 1.

EXAMPLE 5

A black substance obtained by concentrating a black mixture of p-phenylenediamine (5% by weight) and m-phenylenediamine (5% by weight) was cast into the dope in the kneader as in Example 1 in a proportion of 5% of the dope weight. The mixture was thoroughly mixed and a fiber was prepared in the same manner as in Example 1. The obtained fiber was folded 3 times and evaluated for resistance to light. The results are shown in Table 1.

EXAMPLE 6

A black solution was obtained by adding a small amount (less than about 1000 ppm) of a sodium hypochlorite solution to an aqueous solution of o-aminophenol (5% by weight) at 50° C., and the yarns prepared according to the method described in Example 1 were immersed therein for 60 seconds after neutralization step. The yarns were washed with water for 10 seconds and dried at 300° C. for 120 seconds. The obtained fiber was folded 3 times and evaluated for resistance to light. The results are shown in Table 1.

EXAMPLE 7

A black solution was obtained by adding a small amount (less than about 1000 ppm) of a sodium hypochlorite solution to an aqueous solution of 2-amino-4-nitrophenol (5% by weight) at 50° C., and the yarns prepared according to the method described in Example 1 were immersed therein for 60 seconds after neutralization step. The yarns were washed with water for 10 seconds and dried at 300° C. for 120 seconds. The obtained fiber was folded 3 times and evaluated for resistance to light. The results are shown in Table 1.

EXAMPLE 8

A black solution was obtained by adding a small amount (less than about 1000 ppm) of a sodium hypochlorite solution to an aqueous solution of 2-aminophenol-4-sulfonamide (5% by weight) at 50° C., and the yarns prepared according to the method described in Example 1 were immersed therein for 60 seconds after neutralization step. The yarns were washed with water for 10 seconds and dried at 30° C. for 120 seconds. The obtained fiber was folded 3 times and evaluated for resistance to light. The results are shown in Table 1.

EXAMPLE 9

A black solution was obtained by adding a small amount (less than about 1000 ppm) of a sodium hypochlorite solution to a solution of 1,8-diaminonaphthalene (5% by weight) in ethanol at 30° C., and the yarns prepared according to the method described in Example 1 were immersed therein for 60 seconds after neutralization step. The yarns were washed with water for 10 seconds and dried at 200° C. for 120 seconds. The obtained fiber was folded 3 times and evaluated for resistance to light. The results are shown in Table 1.

EXAMPLE 10

The yarns prepared according to the method described in Example 1 were immersed in an aqueous solution of potassium iodide (5% by weight) and copper(II) bromide (2% by weight) at room temperature for 60 seconds after neutralization step. The yarns were washed with water for 10 seconds and dried at 300° C. for 120 seconds. The obtained fiber was folded 3 times and evaluated for resistance to light. The results are shown in Table 1.

EXAMPLE 11

The yarns prepared according to the method described in Example 1 were immersed in a solution having a weight ratio of iodine:potassium iodide:water=1:12.5:8.3 at room temperature for 60 seconds after neutralization step. The yarns were washed with water for 10 seconds of and dried at 300° C. for 120 seconds. The obtained fiber was folded 3 times and evaluated for resistance to light. The results are shown in Table 1.

EXAMPLE 12

The yarns prepared according to the method described in Example 1 were immersed in a solution of a dyestuff acid black 48 (5% by weight) in ethyl alcohol at 50° C. for 60 seconds after neutralization step. The An yarns were washed with water for 10 seconds and dried at 300° C. for 120 seconds. The obtained fiber was folded 3 times and evaluated for resistance to light. The results are shown in Table 1.

COMPARATIVE EXAMPLE 1

A spinning dope was spun, which contained polyparaphenylene benzobisoxazole (14.0% by weight) obtained by the method described in U.S. Pat. No. 4,533,693 and having an intrinsic viscosity as measured with a methanesulfonic acid solution at 30° C., of 24.4 dL/g, and polyphosphoric acid containing phosphorus pentaoxide in 83.17% by weight. The dope was passed through a metal net filter, and kneaded and defoamed in a twin screw kneader. The pressure was elevated, and the dope temperature was maintained at 170° C., and the dope was spun at 170° C. from a spinneret having 160 holes. The delivered yarns were cooled with cooling air at 60° C. and wound around a godet roller to give a spinning speed. The yarns were led into an extraction (coagulation) bath of a 20% by weight aqueous phosphoric acid solution maintained at a temperature of 20±2° C. The yarns were successively washed with ion exchange water in a second extraction bath, immersed in 0.1 mol/L sodium hydroxide solution for neutralization. The yarns were dried at 120° C. for 120 seconds. The obtained fiber was folded 3 times and evaluated for resistance to light. The results are shown in Table 1.

COMPARATIVE EXAMPLE 2

The yarns after final water washing step, which were prepared according to the method described in Comparative Example 1, were dried at 300° C. for 120 seconds. The obtained fiber was folded 3 times and evaluated for resistance to light. The results are shown in Table 1.

COMPARATIVE EXAMPLE 3

The yarns prepared according to the method described in Example 1 were immersed in a solution of 2-mercaptobenzimidazole (reducing agent, 10% by weight) in DMF at 40° C. for 60 seconds after neutralization step. The yarns were washed with water for 10 seconds and dried at 120° C. for 120 seconds. The obtained fiber was folded 3 times and evaluated for resistance to light. The results are shown in Table 1.

TABLE 1

| | light-resisting agent (% by weight) | *1 (%) | *2 (%) | Initial strength (g/d) | Strength after exposure to light* (g/d) | Overall evaluation |
|---|---|---|---|---|---|---|
| Ex. 1 | 4.0 | 100 | 42 | 38.2 | 20.2 | ◯ |
| Ex. 2 | 3.6 | 100 | 39 | 37.6 | 18.2 | ◯ |
| Ex. 3 | 3.9 | 100 | 40 | 37.9 | 20.5 | ◯ |
| Ex. 4 | 0.8 | 85 | 0 | 37.0 | 10.4 | ◯ |
| Ex. 5 | 1.4 | 100 | 72 | 35.6 | 14.1 | ◯ |
| Ex. 6 | 3.2 | 100 | 48 | 37.0 | 16.1 | ◯ |
| Ex. 7 | 3.5 | 100 | 35 | 36.7 | 17.0 | ◯ |
| Ex. 8 | 3.6 | 100 | 31 | 36.8 | 16.5 | ◯ |

TABLE 1-continued

| | light-resisting agent (% by weight) | *1 (%) | *2 (%) | Initial strength (g/d) | Strength after exposure to light* (g/d) | Overall evaluation |
|---|---|---|---|---|---|---|
| Ex. 9 | 3.8 | 100 | 46 | 35.8 | 17.4 | ◯ |
| Ex. 10 | 1.9 | 100 | 23 | 32.0 | 12.7 | Δ |
| Ex. 11 | 5.3 | 100 | 75 | 29.4 | 14.1 | Δ |
| Ex. 12 | 2.1 | 100 | 63 | 34.0 | 7.5 | Δ |
| Com. Ex. 1 | 0 | 18 | 0 | 38.5 | 4.2 | X |
| Com. Ex. 2 | 0 | 20 | 0 | 37.1 | 4.0 | X |
| Com. Ex. 3 | 9.5 | 0 | 0 | 33.2 | 7.3 | X |

(Note)
*1 percentage of wavelength region where regular reflectance is not more than 30% in wavelength 450 nm–700 nm
*2 percentage of wavelength region where regular reflectance is not more than 20% in wavelength 450 nm–700 nm
*exposure to xenon light for 100 hr From the above Table 1, it is appreciated that the article of the present invention shows significantly improved light resistance as compared to conventional articles, and that the inventive article has superior physical properties. In addition, it has a characteristic color.

According to the present invention, a polybenzazole article having superior light resistance can be produced industrially and easily. The present invention affords a greater effect in expanding the field of applicability by enhancing the practicality as an industrial material. In particular, the article is suitable for industrial use in the outdoors where it is exposed to a visible light. It is also suitable for use as an outerwear such as fireman's garments.

This application is based on application No. 36314/1999 filed in Japan, the contents of which are incorporated hereinto by reference.

What is claimed is:

1. A polybenzazole article superior in light resistance, which comprises a polybenzazole and a light-resisting agent that allows for a regular reflectance of the article of not more than 30% in not less than 30% of the wavelength region of from 450 nm to 700 nm, wherein the light-resisting agent is at least one member selected from the group consisting of m-phenylenediamine, p-phenylenediamine, o-aminophenol, 2-amino-4-nitrophenol, 2-aminophenol-4-sulfonamide, and 1,8-diaminonaphthalene.

2. The polybenzazole article of claim 1, wherein the light-resisting agent allows for a regular reflectance of the article of not more than 20% in not less than 10% of the wavelength region of from 450 nm to 700 nm.

3. The polybenzazole article of claim 1, which has a strength of not less than 35 g/d.

4. The polybenzazole article of claim 1, wherein the light-resisting agent is contained in a proportion of 0.01 to 20% by weight of the article.

* * * * *